April 12, 1932.  P. SCHULTES  1,853,150
SPRING CONTROLLED ROLLER FOR ROLLER BLINDS
Filed Jan. 4, 1930
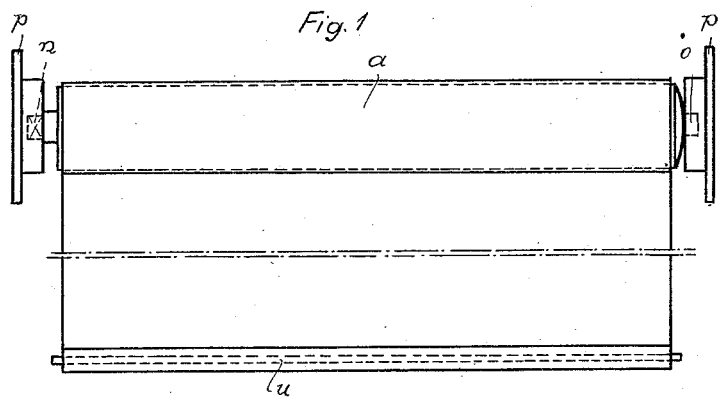
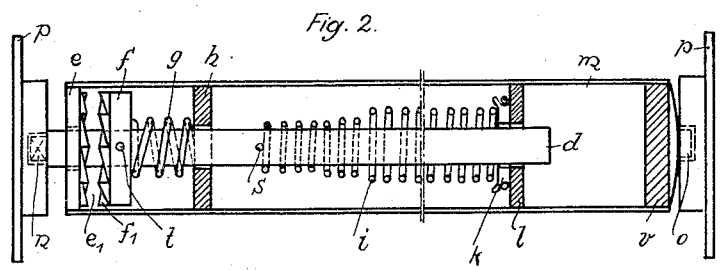
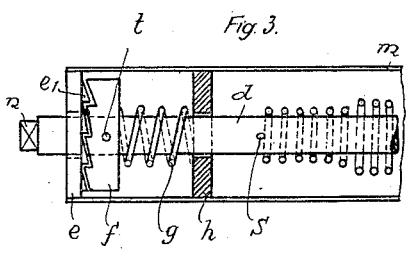
P. Schultes
INVENTOR Patented Apr. 12, 1932

1,853,150

UNITED STATES PATENT OFFICE

PAUL SCHULTES, OF LEICHLINGEN, GERMANY

SPRING CONTROLLED ROLLER FOR ROLLER BLINDS

Application filed January 4, 1930, Serial No. 418,579, and in Germany July 4, 1929.

This invention relates to a spring controlled roller for roller blinds, route indicators and the like, in which the blind or the strip bearing the route indications is kept taut in any particular position of the bottom bar of the blind by the stressing of the helical spring which actuates the roller and by means provided on the said bottom bar and in which the raising and lowering of the blind or strip is effected automatically through the stressing of the roller spring through the said bottom bar being pushed up and down by hand, the blind or strip winding up on to the spring roller.

The present invention relates to a spring controlled roller of the kind stated, which is provided with an arrangement for enabling the spring which actuates the roller to be stressed and unstressed so as to give the spring the requisite tension before placing the roller in its bearings and to keep the spring so tensioned while the roller in being placed in the bearings and removed therefrom, that is to prevent the spring running down.

For this purpose according to the invention the end of the roller shaft supporting the spring controlled roller, which projects out of the latter, and the bearing belonging to it are so constructed that the roller shaft cannot be turned when the roller is in position. The free end of the roller is suitably made square and the bearing belonging to it provided with a corresponding square hole.

The novel feature of the roller blind according to the invention is that within the spring controlled roller is a clutch arrangement by which the spring actuating the roller is held in its stressed state while the roller is being placed in position and removed.

The invention is illustrated by way of example in the accompanying drawings, in which Fig. 1 shows in elevation a roller blind with a spring controlled roller according to the invention when in position, Fig. 2 the spring controlled roller according to the invention in longitudinal section when in position and Fig. 3 is a longitudinal section of part of the roller according to the invention in the dismounted condition with the clutch member in engagement.

In the drawings $a$ is the spring controlled roller, $r$ the blind or the strip bearing the characters, $u$ the bottom blind rod and $p$ and $q$ the lateral bearings which are screwed inside the window frame and in which the roller $a$ is journalled. The roller $a$ consists of the tubular shell part $m$, the end disc $v$ fixed rigidly to it and having the round journal $o$ the end ring $e$ also fixed rigidly to the shell part $m$ and the two bearing discs $h$ and $l$ also fixed to the shell part. The spring controlled roller $a$ is rotatable with its bearing discs $h$ and $l$ and the end ring $e$ on the roller shaft $d$. Between the end ring $e$ and the bearing disc $h$ there is fixed on the roller shaft $d$ by means of the pin $t$ a clutch member $f$ provided with ratchet teeth $f_1$. Between the clutch member $f$ and the bearing disc $h$ and wound round the roller shaft $d$ there is a helical spring $g$ by which the roller shaft $d$ with the clutch member $f$ is forced in the direction of the end ring $e$. The end ring $e$ has ratchet teeth $e_1$ on the side facing the clutch member $f$. Between the bearing disc $h$ and the bearing disc $l$ the helical spring $i$ which actuates the roller is fixed in a known manner at one end at $s$ to the roller shaft $d$ and at the other end to the bearing disc $l$. $n$ is the free end of the roller shaft $d$ which projects out of the roller $a$ and is preferably made square. The hole in the lateral bearing $p$ is correspondingly square. The other lateral bearing $q$ has a round hole for receiving the round journal $o$.

For stressing the spring $i$ before the roller is placed in position, the roller $a$ is held firmly in one hand and the end journal $n$ of the roller shaft $d$ turned by means of a key placed on the square end until the spring $i$ is sufficiently stressed. On the key being removed the clutch $f$ will engage automatically and the spring $i$ be held in its stressed condition. The bearings $p$ and $q$ must be screwed to their supports in such a manner that when placing the roller in position the shaft $d$ with the end journal $n$ can be pushed back sufficiently far to disengage the clutch $f$. By this means the spring is released for operating the blind. On the blind being drawn down, the spring $i$ is additionally stressed and on the blind being released, it will freely fly up automatically. For holding the blind at any desired intermediate height any of the ordinary commercially obtainable means may be used at the bottom end of the blind.

When removing the roller blind, the roller $a$ is pushed on the roller shaft $d$ in the direction of the bearing $p$ until the bearing $q$, releases the round journal $o$ when the roller $a$ can be withdrawn from the bearing $p$. This will cause the clutch $f$ to engage automatically through the action of the spring $g$ with the teeth $e_1$ on the end ring $e$, so that the spring is kept in its stressed condition.

If the spring $i$ is to be further stressed or unstressed, the procedure is the same as that described above for stressing the spring, only that, when unstressing the spring $i$ the roller shaft $d$ is turned in the opposite direction, the clutch member $f$ being disengaged by applying pressure towards the end journal $n$.

The roller blind according to the invention has this advantage over the known devices of this kind that the blind or the strip bearing the characters can occupy almost the entire width of the window frame and that, when letting up the blind or strip, there can be no check owing to the sudden engagement of the clutch member due to its centrifugal force.

Instead of the spring $i$ being fixed to the bearing disc $l$ it may be fixed to a carriage which is slidable in the tubular shell $m$, but secured from turning in the same.

In place of the ratchet teeth $f_1$ and $e_1$ any other suitable coupling members may be used.

Having now particularly described and ascertained the nature of my said invention and in what manner the same is to be performed, I declare that what I claim is:

A roller for shades including a hollow body part, a plurality of internal spaced bearing members therein, a single rotatable spindle passing through said bearings and rotatable and axially movable therein, spring means normally tending to turn said spindle, second spring means normally tending to displace the spindle axially, a clutch member carried by the body member, and a clutch member carried by the spindle, the second mentioned clutch member being under the influence of the second spring means, the second spring means being confined between the second clutch member and one of said bearings.

In testimony whereof I affix my signature.

PAUL SCHULTES.